No. 632,846. Patented Sept. 12, 1899.
T. J. POPE.
FARRIER'S KNIFE.
(Application filed June 24, 1899.)
(No Model.)
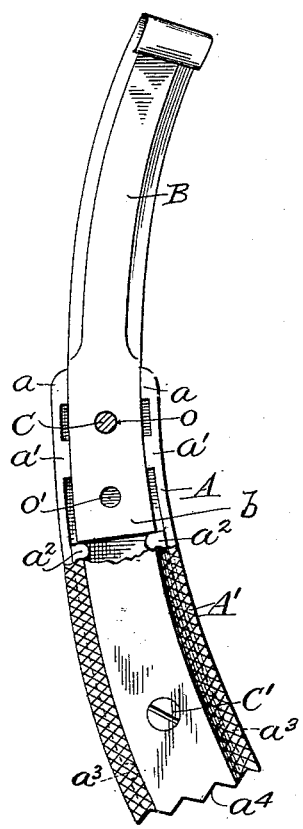
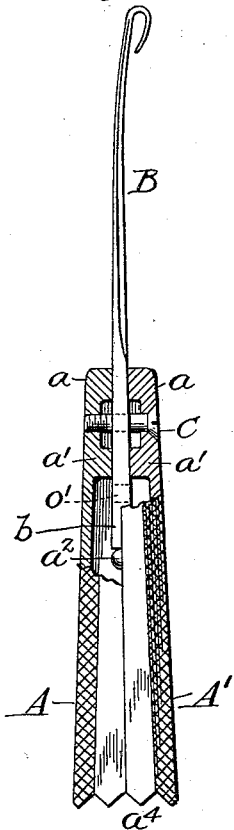
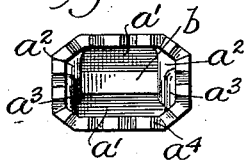
WITNESSES
James P. Duhamel
C. L. Miller
INVENTOR
Tjerck J. Pope
BY
E. F. Kennert
HIS ATTORNEY
THE NORRIS PETERS CO., PHOTO-LITHO., WASHINGTON, D. C.

UNITED STATES PATENT OFFICE.

TJERCK J. POPE, OF SAUQUOIT, NEW YORK.

FARRIER'S KNIFE.

SPECIFICATION forming part of Letters Patent No. 632,846, dated September 12, 1899.

Application filed June 24, 1899. Serial No. 721,710. (No model.)

*To all whom it may concern:*

Be it known that I, TJERCK J. POPE, a citizen of the United States, and a resident of Sauquoit, in the county of Oneida and State of New York, have invented certain new and useful Improvements in Farriers' Knives, of which the following is a specification.

My invention relates to improvements in handles for and shanks of knives adapted for farriers' or horseshoers' use, the objects being to make the blades adjustable in length, to shape the handle so that it fits more naturally in the hand, and so to serrate the lower end or bottom of the handle that there will be no liability of its slipping off of a hot horseshoe when the shoe is being fitted to the hoof.

In the drawings making part of this specification, Figure 1 represents a side view of my improved handle, part of it being broken away to show one position of the knife-blade. Fig. 2 is an edge view of Fig. 1, and Fig. 3 shows an end view of lower end of the handle.

Similar letters of reference in the several views refer to similar parts.

A A' is a metal handle in two sections cast hollow and slightly curved. On the inner surface of the sections and near the upper end two sets of ribs $a\ a'$ are formed in casting, so that a recess will be formed when the sections of handle are put together. On the inner edge of each section I cast, say, two sets or pairs of lugs, one set $a^2$ being not quite down half-way, so as to limit the movement of the flat shank $b$ of the blade B, and the other pair of lugs $a^3$ near the lower end of handle. These lugs being on opposite sides of each section are made to fit neatly into the other section of the handle, so there will be no play between the two sections. To securely hold the sections together, I use a screw C, which passes through a hole in the shank $b$ of the blade, and another screw C' near the lower end of the handle. The handle is curved, and to prevent its slipping in the hand and to afford a firmer grip the surface is cross-grooved, as shown. This is done on the patterns, so that the surface is produced in casting. The lower end $a^4$ is serrated, so that when the hot horseshoe is fitted to the hoof, as usual, the pritchel being temporarily inserted in one of the nail-holes in the shoe the lower end of the knife-handle is pressed down on the heel or toe calk, and, being serrated, there is no danger of its slipping off and burning the hand of the horseshoer. The blade B is of the conventional type, having either one or two cutting edges, but being provided with a shank $b$, having a plurality of holes $o\ o'$ to permit the blade being lengthened or shortened, as required. When the shank is at its lowest point, the bottom of it strikes the lugs $a^2$. The screw-holes in the two sections of the handle will then be on a line with the hole $o$ in the shank. The shank and handle have the same radius, so that the sweep of the knife remains the same whether it is long or short.

Such being the construction of my improved knife, the operation is as follows: To insert a blade, unscrew the screw C, giving screw C' a few turns backward also. Insert the flat shank of the blade to any desired length, pass screw C back into its place through the hole in the shank and into the opposite section of handle, and tighten up. Draw up screw C' and knife is ready to use. To remove the knife, reverse the operation.

I do not broadly claim the removable blade or the ribs and recesses within the handle, that being described in another patent issued to me; but What I do claim as new, and desire to secure by Letters Patent, is—

1. A farrier's knife consisting of the handle having one end serrated for the purpose set forth, and the blade secured within and projecting from the other end thereof, substantially as described.

2. In a knife, the combination with the blade having a transverse hole through its shank; of the hollow handle having in one end a recess for the reception of said shank and in its body alined holes at right angles thereto, and lugs so located within said body that when the end of the shank rests against them the hole therein alines with those in the handle, and a screw removably inserted through these holes, as and for the purpose set forth.

3. In a knife, the combination with the blade B having a plurality of holes $o\ o'$ through its shank $b$; of the handle made in complementary sections A A' having meeting ribs $a\ a'$ internally recessed for the reception of said shank and meeting lugs $a^2$ adapted to abut against the end of the shank when in place, the length of the latter being such that when it is so located a fastening device C can be passed through one of its holes and through an alined pair of holes in the handle, all as and for the purpose set forth.

Signed at Sauquoit, in the county of Oneida and State of New York, this 19th day of June, A. D. 1899.

TJERCK J. POPE.

Witnesses:
M. J. MITCHELL,
J. C. DEVRK.